United States Patent
Trinkel et al.

(10) Patent No.: US 7,187,758 B2
(45) Date of Patent: Mar. 6, 2007

(54) ORGANIZATION OF A TELECOMMUNICATION NETWORK IN EXCEPTIONAL CASES

(75) Inventors: Marian Trinkel, Kreuzau-Untermaubach (DE); Frank Bindel, Koenigswinter (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 10/503,115

(22) PCT Filed: Jan. 10, 2003

(86) PCT No.: PCT/DE03/00050

§ 371 (c)(1),
(2), (4) Date: Jul. 30, 2004

(87) PCT Pub. No.: WO03/067862

PCT Pub. Date: Aug. 14, 2003

(65) Prior Publication Data

US 2005/0105710 A1    May 19, 2005

(30) Foreign Application Priority Data

Feb. 2, 2002    (DE) ............................... 102 04 300

(51) Int. Cl.
*H04M 11/00* (2006.01)
(52) U.S. Cl. .................. 379/37; 379/221.03
(58) Field of Classification Search ............ 379/37–51, 379/221.03, 101.01
See application file for complete search history.

(56) References Cited

U.S. PATENT DOCUMENTS

| 5,029,290 | A | * | 7/1991 | Parsons et al. ................ 379/39 |
| 5,222,128 | A | * | 6/1993 | Daly et al. ............. 379/221.04 |
| 5,844,974 | A | | 12/1998 | Ichikawa ..................... 379/138 |
| 5,912,947 | A | * | 6/1999 | Langsenkamp et al. ....... 379/51 |
| 5,987,110 | A | * | 11/1999 | Malik et al. ............. 379/221.09 |
| 6,118,866 | A | * | 9/2000 | Shtivelman ............ 379/210.02 |
| 6,594,345 | B1 | * | 7/2003 | Vinson ................... 379/221.08 |
| 6,798,875 | B2 | * | 9/2004 | DuCharme ............. 379/221.03 |
| 2001/0040887 | A1 | * | 11/2001 | Shtivelman et al. ......... 370/352 |

FOREIGN PATENT DOCUMENTS

| EP | 1032236 | | 8/2000 |
| JP | 10075309 A | * | 3/1998 |
| WO | 0018096 | | 3/2000 |
| WO | 02058366 | | 7/2002 |

* cited by examiner

*Primary Examiner*—Stella Woo
(74) *Attorney, Agent, or Firm*—Darby & Darby

(57) ABSTRACT

A method for operating a telecommunication network in exceptional situations includes defining a group of connections of the network, the connections each having a respective terminal connected thereto, the connections being dialable via individual network identification numbers. The connections are blocked for calls to be allocated to the connections. Lines leading to the connections are rerouted via a server connected to the network. The server is used to organize the calls.

21 Claims, 1 Drawing Sheet

ORGANIZATION OF A TELECOMMUNICATION NETWORK IN EXCEPTIONAL CASES

The present invention relates to a method for operating a communication network, such as a telephone network or the Internet, in an exceptional case, or situation, such as a situation of a temporary heavy load, especially in case of a hazardous situation affecting at least part of the population, whereby the network comprises a plurality of connections to which terminals, for example, telephones, computers, or fax machines can be connected, whereby said connections can each be dialed via individual network identification numbers and whereby a central computer (server) is tied into the network for purposes of organizing the connections.

BACKGROUND

Until recently, the population was informed about the occurrence of such hazardous situations of the type stemming, for example, from major fires, by means of sirens or loudspeakers. This modality of providing warnings by sirens installed over widespread areas no longer exists since these signal devices have gradually lost their importance and have been dismantled by municipalities in order to save on maintenance costs. After all, sirens were relicts from wartime and only still had some significance in rural areas, where fire department volunteers had to be called together quickly. As time went by, the population even forgot the significance of the sound signals.

Informing the population by means of permanently installed loudspeakers had already fallen into disuse some time ago and the dissemination of messages via mobile loudspeakers is hardly encountered any more nowadays. Ultimately, such systems for informing the population are gradually dying out due to the dominance of electronic media such as radio, television and computers.

SUMMARY OF THE INVENTION

The drawback of the loss of the known systems, however, is that the new media can no longer ensure that the entire population will be informed in an all-encompassing manner. However, precisely the events on Sep. 11, 2001 in the United States have shown that the capability to inform an entire segment of the population in an affected region can be a matter of life or death. If an accident or criminal act were to threaten the population, for example, by a spreading cloud of toxic gas, there has to be a system in place with which those affected can be warned and kept informed.

Such disasters also lead to the problem that persons who have been informed via the media then use the communication networks to, in turn, obtain specific information. For instance, an affected person will immediately reach for the telephone to get help, to inform relatives or to obtain further information. Under this sudden onslaught of calls, certain communication routes, particularly to the emergency organizations, or even the entire network, can break down, which then even further exacerbates the disaster. In our communication-based society, all organization then collapses and chaos ensues.

Therefore, an object of the present invention is to provide a method that ensures all-encompassing dissemination of information to segments of the population and that can be implemented and automated with simple means, that functions reliably and that ensures that the information is provided to a large number of people. Moreover, the method should contribute to alleviating the burden on the existing network resources in order to prevent a collapse of the system. It is also an object of the invention to provide a system for implementing the method.

The present invention provides a method for operating a telecommunication network in exceptional situations, the network including a plurality of connections configured to each have a respective terminal connected thereto, the connections being dialable via individual network identification numbers. The method includes:
defining a group of first connections of the connections;
blocking the first connections for first calls, the first calls being calls to be allocated to the first connections;
rerouting, via a server connected to the network, respective lines leading to the first connections; and
organizing the first calls using the server.

The present invention also provides a system including a telecommunication network, a plurality of terminals each connected to the network via a respective connection, and a server configured to organize calls routed via the network. The server includes an emergency module implemented thereon. The emergency module is configured to, in an exceptional situation: define a group of the connections; block a respective direct link to any of the connections of the group; and intervene as an intermediary in respective links associated with the connections of the group so as to provide a buffer function.

An idea of the invention is to organize the connections of the affected persons via a central server, that is to say, for example, all connections of a locally delineated area that can normally use the network at will to engage in communication. This group of connections is removed from normal traffic so to speak and is organized separately by the server. These can be connections for landline telephones, mobile telephones, faxes or computers. Correspondingly, the Internet also counts as a telecommunication network. Thus, in exceptional cases, a group of connections is defined, particularly on the basis of its known network identification number and this group of connections is then blocked for incoming as well as outgoing calls. This blocking can be illustrated by visualizing that the server is placed upstream from these connections. Thus, each line having to do with these connections is rerouted via the server. A direct "uncontrolled" access is no longer possible. According to the invention, from a central place, the server now organizes all calls that are to be allocated to these connections. The population can now be selectively and efficiently warned by means of the invention.

BRIEF DESCRIPTION OF THE DRAWING

The present invention is elaborated upon below based on an exemplary embodiment with reference to the drawing, in which.

DETAILED DESCRIPTION

Figure 1:
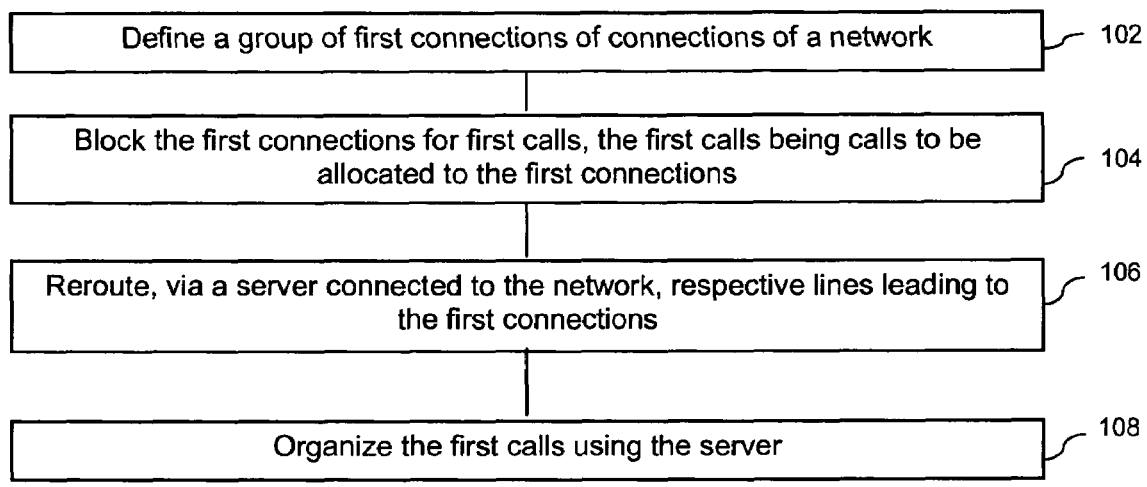
FIG. 1 shows a flow diagram of a method for operating a telecommunication network in exceptional situations.

FIG. 1 shows a flow chart of a method for operating a telecommunication network in exceptional situations. The network includes a plurality of connections configured to each have a respective terminal connected thereto, the connections being dialable via individual network identification numbers. According to the method, a group of first connections of the connections of the network is defined (see step 102). The first connections are blocked for first calls, the first calls being calls to be allocated to the first connections (see step 104). Respective lines leading to the first connections are rerouted via a server connected to the network (see step 106). The first calls are organized using the server (see step 108).

The invention can be realized by a system having, first of all, a telecommunication network with a plurality of terminals that can be hooked up to said network via connections, and having a server to organize calls routed via the network, whereby, in case of an exceptional situation, an emergency module implemented on the server defines a group of connections and blocks the direct link to these connections, a process in which the module intervenes as an intermediary in the links associated with the connections and thus functions as a buffer. The server intercepts all of the calls relating to the group and harmonizes the establishment of the connections. An advantage of the invention lies in the fact that the components needed for its realization already exist in modem communication networks and can be deployed immediately. Consequently, no additional costs for hardware components are incurred.

Therefore, a major advantage is firstly that all of the inhabitants of a district or region can be provided with information in a systematic manner. The server can gradually dial all of the identification numbers in order to contact the inhabitants. Therefore, in exceptional cases, the server transmits a message that is intended to inform the public to either some or to all of the connections of the selected group via each terminal. The information can be disseminated as spoken or written text. The strategy of controlled targeted information entails an important advantage: through a controlled switching of the lines, the server can prevent the network from becoming overloaded and collapsing before each subscriber has been contacted. The targeted dissemination of the information and the suppression of outgoing calls contributes to avoiding an uncontrollable reaction on the part of the population, thus preventing chaos. Of course, it is also conceivable to connect several servers to the network in a "decentralized" manner, whereby each computer on its own is capable of effectuating the organization according to the invention.

In order to perform its task, the server advantageously uses a batch processing program that organizes the transmission of the messages, whereby this program processes the list of identification numbers that are stored there by dialing them and automatically transmitting the voice message or text message. This batch program can be tailored by a deployment center in that a list with the identification numbers of the relevant connections is generated. One server can also process several such batch programs simultaneously.

It is advantageous if the server records whether the information was, in fact, received by the terminal. This recording can be done automatically in that the server notes the answering of the telephone and thus the establishment of the connection. It is also possible to address the answering party by name and to request confirmation of the call, for example, by means of voice verification or by a return call. After all, in the hazardous situation, it is important to reach every single person. In case of an unsuccessful call, the server might use another medium to attempt to establish contact.

In addition to this possibility of providing a group of persons with information in a targeted manner, the invention has the further advantage that calls directed to the group from the outside can also be received and further processed. The server then fulfills the role of a central and "intelligent" mobile mailbox. Each concerned caller can leave a message and does not have to be confronted by a busy tone. In an especially simple version, the caller is informed by a text message that the call cannot be made because of an overload. This message can include the information as to when the caller can expect to be able to make the call. For the caller, it is especially convenient and thus advantageous to be given the possibility to leave a message for the desired contact person. The server will then record this message and, in due time, automatically forward it to the desired contact person. Of course, the described possibilities are not only available to callers from outside. The member of the affected group who is making a call to the outside is also offered the option of being informed and of contacting the people outside via the "mailbox".

It is also advantageous that the server can answer the call by means of a voice module and can offer the caller the option of speaking words to navigate through a menu. Thus, on the one hand, the calls can be channeled in a certain manner, for example, to emergency organizations and, on the other hand, the caller is reassured by the dialog since he/she has the feeling that something is being done. Via such a dialog the caller can be offered additional information or, in especially urgent cases, for example, in case of life-threatening injuries, the caller can still be connected to the emergency services fairly quickly. In this context, it is also advantageous to assign priorities to the connections and/or to the incoming or outgoing calls in order to give preference to urgent messages during the processing. Thus, in certain cases, it is imperative that the public authority or the rescue operations not be hindered by the server. Here, the priorities can be assigned to the individual network identification numbers or else certain persons with a privileged status are given a code which they provide to the program that is implemented on the server. The identification can also be carried out by means of voice verification, ID numbers or a digital signature. The establishment of the appropriate connection is then given priority.

So that the server can carry out its moderating task, it is advantageous to specify the momentary network load as a parameter for the server, whereby the server then takes care not to overload the network when it handles the calls that are to be processed and that have accumulated. In this manner, a collapse of the communication routes, especially to the emergency organizations, and a collapse of the entire network can be ruled out.

The invention claimed is:

1. A method for operating a telecommunication network in exceptional situations, the network including a plurality of connections configured to each have a respective terminal connected thereto, the connections being dialable via individual network identification numbers, the method comprising:

defining a group of first connections of the connections on the basis of a group network identifier;

blocking the first connections for incoming and outgoing first calls, the first calls being calls to be allocated to the first connections;

rerouting, via a server connected to the network, respective lines leading to the first connections; and organizing the first calls using the server.

2. The method as recited in claim 1 wherein the exceptional situations include a situation of temporary heavy load in a hazardous situation affecting at least part of a population.

3. The method as recited in claim 1 wherein the terminals include at least one of a telephone, a computer and a fax machine.

4. The method as recited in claim 1 wherein the server includes a central computer.

5. The method as recited in claim 1 further comprising transmitting, using the server, a message to at least one of the first connections via the respective terminal, the message being for informing the public.

6. The method as recited in claim 5 wherein the transmitting is performed by the server using a batch processing program configured to process a list of stored identification numbers so as to dial the numbers and automatically transmit the message.

7. The method as recited in claim 6 wherein identification numbers are stored at the server.

8. The method as recited in claim 6 wherein the message is at least one of a voice message and a text message.

9. The method as recited in claim 5 further comprising:
   recording, using the server, whether the message was received by the respective terminal; and
   attempting a retransmitting of the message when the message was not received by the respective terminal.

10. The method as recited in claim 1 further comprising automatically answering the first calls using the server.

11. The method as recited in claim 10 further comprising informing, by a text message, a caller of an incoming call of the first calls that the incoming call cannot be made at that time.

12. The method as recited in claim 11 further comprising:
    providing the caller an opportunity to leave a first message for a desired contact person; and
    recording and automatically forwarding the first message to the desired contact person using the server.

13. The method as recited in claim 1 further comprising providing a voice module implemented on the server, the voice module offering a caller an option of speaking words to navigate through a menu.

14. The method as recited in claim 1 further comprising prescribing a momentary network load as a parameter for the server, and wherein the organizing is performed by the server processing calls in a manner so as not to overload the network.

15. The method as recited in claim 1 wherein the organizing is performed by the server processing the first calls so as to assign a priority to at least one of the respective connections so as to give preference to urgent messages during the processing.

16. The method as recited in claim 1 wherein the first calls include incoming calls and wherein the organizing is performed by the server processing the first calls so as to assign a priority to at least one of the incoming calls so as to give preference to urgent messages during the processing.

17. The method as recited in claim 1 further comprising a second server connected to the network, the second server being capable of performing the organizing.

18. The method as recited in claim 1 wherein the first calls include at least one of incoming and outgoing calls.

19. A system comprising:
    a telecommunication network;
    a plurality of terminals each connected to the network via a respective connection; and
    a server configured to organize calls routed via the network, the server including an emergency module implemented thereon, the emergency module being configured to, in an exceptional situation:
       define a group of the connections on the basis of a group network identifier;
       block a respective direct link to any of the connections of the group for incoming and outgoing calls; and
       intervene as an intermediary in respective links associated with the connections of the group so as to provide a buffer function.

20. The system as recited in claim 19 wherein the emergency module is configured to transmit a message to at least one of the connections of the group of connections via the respective terminal, the message being for informing the public.

21. The system as recited in claim 19 wherein the server is configured to:
    automatically answer the calls;
    inform, by a text message, a caller of an incoming first call that the incoming first call cannot be made at that time;
    provide the caller an opportunity to leave a first message for a desired contact person; and
    record and automatically forward the first message to the desired contact person.

* * * * *